United States Patent [19]

Terashima et al.

[11] Patent Number: 4,981,920

[45] Date of Patent: Jan. 1, 1991

[54] POLYAMIDE RESIN COMPOSITION AND A SHAPED ARTICLE

[75] Inventors: Takeshi Terashima, Nagoya; Toshimi Nomura, Chita, both of Japan

[73] Assignee: Toray Industries, Inc., Tokyo, Japan

[21] Appl. No.: 323,732

[22] Filed: Mar. 15, 1989

[30] Foreign Application Priority Data

Mar. 17, 1988 [JP] Japan ................................ 63-61992

[51] Int. Cl.$^5$ ....................... C08L 71/12; C08L 77/00
[52] U.S. Cl. .................................... 525/397; 525/905; 524/508; 524/514
[58] Field of Search ............... 525/397, 905; 524/508, 524/514

[56] References Cited

U.S. PATENT DOCUMENTS 4,657,264 4/1987 Kerschbaumer et al. .
4,772,664 9/1988 Ueda et al. .......................... 525/397

FOREIGN PATENT DOCUMENTS 129825 1/1985 European Pat. Off. .
192264 8/1986 European Pat. Off. .

Primary Examiner—Jacob Ziegler

Attorney, Agent, or Firm—Armstrong, Nikaido, Marmelstein, Kubovcik & Murray

[57] ABSTRACT

A polyamide resin composition comprising:

(a) 5 to 65% by weight of at least one polyamide resin selected from the group consisting of a polyamide having caproamide units, a polyamide having hexamethylene adipamide units and a polyamide having aromatic rings as a main molecular unit in the polymer, (b) 65 to 30% by weight of a polyamide resin which is obtained by melt polymerization of at least one compound selected from the group consisting of an aliphatic aminoacid and lactum having 11 or 12 carbon atoms and an equivalent molar salt having 13 to 24 carbon atoms of an aliphatic diamine having 6 to 12 carbon atoms and an aliphatic dicarboxylic acid having 6 to 12 carbon atoms, and (c) 30 to 5% by weight of a polyphenylene oxide. This polyamide resin composition is excellent in properties of a thermal resistance, a heating-cooling repeat resistance, a rigidity, a toughness and a road antifreezing agent resistance, and a shaped article of it is useful for an exterior part of automobile.

8 Claims, No Drawings

POLYAMIDE RESIN COMPOSITION AND A SHAPED ARTICLE

BACKGROUND OF THE INVENTION

The present invention relates to a polyamide resin composition and its shaped article which have excellent properties such as a thermal resistance, a heating-cooling repeat resistance, a rigidity, a toughness, a road antifreezing agent resistance and so on.

Recently polyamide resins are applied to exterior parts of an automobile, for example, a cooling fan, a top and a base of radiator tank, a top and a base of heater core tank, a cylinder head cover, a canister, a gear, a connector, a valve, oil pans, a brake tube, a tube for fuel tubing and parts for exhaust gas, because the polyamide resins have excellent properties such as a heat resistance, an oil resistance, a moldability, a rigidity and a toughness, etc.

Higher polyamide resins represented by nylon 11 and nylon 12 among polyamide resins have not only good properties such as a toughness, dimensional stability and chemical agent resistance but also an excellent resistance to road antifreezing agents such as calcium chloride and magnesium chloride.

Therefore, they have aroused interest in using as materials for the exterior parts of automobile and have already been used as some specific functional parts.

The fact is, however, that an extension of application for the higher nylons is limited because of insufficient thermal resistance and rigidity in comparison with metals.

On the other hand, since polyamides having a comparatively high amide group concentration, such as nylon 6 and nylon 66, have high thermal resistance and high toughness and are inexpensive, they have been used as materials for exterior parts of an automobile. However, they are not necessarily satisfactory materials because they have defects that they have a high hydroscopicity and a poor dimensional stability, and that they are attacked by road antifreezing agents such as calcium chloride, magnesium chloride and crack.

It is known to compensate for polymer defects by mixing the lower polyamide such as nylon 6, nylon 66, etc. and the higher polyamide such as nylon 11, nylon 12, etc. (Japanese Pat. Application Kokai Publication Nos. 57-212252, 57-80448 and 57-80449).

The blends of the lower polyamide and the higher polyamide have a considerable supplemental effect on each other, but they also have a poor heat resistance because the higher polyamide has a lower melting point. Furthermore, the blends are insufficient in, the so called, "heat-cooling repeat resistance" and are insufficient in a resistance for calcium chloride under condition such as heating-cooling repeat.

Meanwhile, the experior parts of automobile require many excellent properties which must resist a high temperatures from the heat of the an engine, resistance to a heating-cooling repeat caused a radiator and must protect against cracking caused by halogenated metal such as calcium chloride which is spread on the road as a road antifreezing agent. The exterior parts must also possess excellent rigidity, toughness and dimensional stability.

SUMMARY OF THE INVENTION

An object of the present invention is to provide a polyamide resin composition having excellent properties such as a thermal resistance, a heating and cooling repeating resistance, a rigidity, a toughness, a road antifreezing agent resistance and so on.

The other object of the present invention is to provide a polyamide resin shaped article suitable for exterior parts of automobile.

The above objects of the present invention is achieved by providing the following composition and shaped article.

A polyamide resin composition comprising:
(a) 5 to 65% by weight of at least one polyamide resin selected from the group consisting of a polyamide having caproamide units, a polyamide having hexamethylene adipamide units and a polyamide having aromatic rings as a main molecular unit in the polymer,
(b) 65 to 30% by weight of a polyamide resin which is obtained by melt polymerization of at least one compound selected from the group consisting of an aliphatic aminoacid and lactum having 11 or 12 carbon atoms and an equivalent molar salt having 13 to 24 carbon atoms of an aliphatic diamine having 6 to 12 carbon atoms and an aliphatic dicarboxylic acid having 6 to 12 carbon atoms, and
(c) 30 to 5% by weight of a polyphenylene oxide; and a shaped article composed of the above polyamide resin composition.

DETAILED DESCRIPTION OF THE PREFERRED EMBODIMENTS

The polyamide having aromatic rings as a main molecular unit in the polymer used as the component (a) in the present invention is selected from group consisting of an aromatic polyamide composed consisting of aromatic compounds, an aromatic ring-involved polyamide polymerized the equivalent molar salt of an aliphatic diamine and an aromatic dicarboxylic acid and a copolyamide copolymerized an aliphatic polyamide with an aromatic polyamide or an aromatic ring involved polyamide. The number of carbon atom is 4 to 8 preferably, and 6 is the best. As the aliphatic polyamide, nylon 4, nylon 6, nylon 46 or nylon 66 is preferable, and nylon 6 or nylon 66 is more preferable. As the aromatic, terephthalic acid or isophthalic acid is preferable.

The typical aromatic polyamides can be used are poly(p-phenylene terephthalamide) or poly(p-phenylene isophthalamide).

The typical aromatic ring involved-polyamides can be used are polyhexamethylene terephthalamide (nylon 6T, T represents terephthalic acid), nylon 6I (I represents isophthalic acid), nylon 4T or nylon 4I.

The typical copolyamide can be used are nylon 66/6T (mark/represents copolymerization), nylon 66/6I, nylon 6/6T, nylon 6/6I, nylon 46/6T, nylon 46/6I and so on.

Representative examples of the polyamide to be used as the component (b) in the present invention include those obtained by melt polymerization of at least one member selected from among an aliphatic diamine having 6–12 carbon atoms such as 11-aminoundecanoic acid, 12-aminododecanoic acid, ω-laurolactam, and equimolar salts of hexamethylenediamine, undecamethylenediamine, dodecamethylenediamine or 2,2,4-/2,4,4-trimethylhexamethylenediamine with an aliphatic dicarboxylic acid having 6-12 carbon atoms such as adipic acid, azelaic acid, sebacic acid or dodecanedioic acid (except for an equimolar salt of hexamethylenediamine with adipic acid), such as nylon 11, nylon 12, nylon 6.9, nylon 6 10, nylon 6.12, nylon 11.6, nylon 11.12, nylon 12.6, nylon 12.10, nylon 12.12, and copolymers containing the same as the main constituent component. The polymerization degrees of the polyamides to be used here are not particularly limited. Usually, polyamides having a relative viscosity of 2.0 to 6.0 can be arbitrarily chosen.

The polyphenylene oxide (PPO) to be used as the component (c) in the present invention is represented by the formula below.

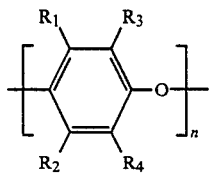

wherein each $R_1$ to $R_4$ represents hydrogen or an alkyl group having 1 to 4 carbon atoms. The polymerization degree, n, is especially not limited.

A modified PPO or unmodified PPO can be used in the present invention.

The modified PPO in the present invention means PPO which is graft-polymerized with a compound having an active group or is copolymerized with a minor amount of other polymer.

Examples of the inorganic reinforcement to be used in the present invention include a glass fiber, an asbestos fiber, a carbon fiber, wollastonite, talc, calcium carbonate, magnesium oxide, alumina, mica, spherical glass potassium titanate whiskers, kaolinite and clay.

The polyamide resin composition in the present invention is composed of a material prepared by mixing 5 to 65%, preferably 25 to 55% by weight of the polyamide component (a), 65 to 30%, preferably 55 to 40% by weight of the polyamide component (b) and 30 to 5%, preferably 20 to 5% by weight of the polyphenyleneoxide component (c), and 1 to 200 parts by weight of the inorganic reinforcement per 100 parts by weight of the mixture of (a) to (c) if it is desired.

When a proportion of the polyamide component (a), i.e. nylon 6, nylon 66 and polyamide having an aromatic ring, in the total polymer composition, is less than 5 weight %, it is unfavorable because no shaped article having a high thermal resistance and a high rigidity can be obtained.

On the other hand, when the proportion of the polyamide component (a) in the total polymer composition exceeds 65 weight %, it is unpractical because the heating-cooling repeat resistance, the road antifreezing agent resistance of the shaped article, for example the exterior parts of automobile, are conspicuously deteriorated.

When a proportion of the polyamide component (b), i.e. the higher polyamide such as nylon 6.10, nylon 6.12, nylon 11, nylon 12 and so on, in the total polymer composition exceeds 65 weight %, it is unfavorable because no shaped article having a high thermal resistance, a high rigidity and a high toughness can be obtained.

On the other hand, then a proportion of the polyamide component (b) in the total polymer composition is less than 30 weight %, it is unpractical because the heating-cooling repeat, resistance, the road antifreezing agent resistance and the dimensional stability are conspicuously deteriorated.

The PPO component (c) is essential in the present invention to obtain a shaped article having excellent properties.

When a proportion of the PPO component (c) in the total polymer composition exceeds 30 weight %, it is unfavorable because no shaped article having a high thermal resistance and a high rigidity can be obtained, and a molding processability to obtain an exterior part of automobile is deteriorated.

On the other hand, a proportion of the PPO component (c) in the total polymer composition is less than 5 weight %, a shaped article having a high heating-cooling repeat resistance, a high road antifreezing agent resistance and a high dimensional stability can not be obtained.

No inorganic reinforcement, is needed where an exterior part of automobile requires a flexibility, such as a tube, is formed. On the other hand, when the amount of the inorganic reinforcement exceeds 200 parts by weight per 100 parts by weight of the total polyamide, it is unfavorable because the toughness of the resulting exterior part is rather reduced and becomes brittle to spoil the function thereof.

The method of mixing the polyamides, the PPO with the inorganic reinforcing material is not particularly limited and any known method can be employed.

Namely, any one of a method comprising the following three methods is employed; (a) a melt-kneading a mixture by an extruder having a capability of sufficient kneading after pellets, powders, small pieces, or the like of at least two kind of polyamides and PPO are homogeneously mixed with an inorganic reinforcement by a high-speed agitator, (b) a melt-kneading a mixture of pellets, which were obtained by melt-kneading polyamides and PPO, and (c) inorganic reinforcement and a dry blend injection molding or extrusion molding.

The shaped article in the present invention is generally formed by a known molding method for thermoplastic resins such as injection molding, extrusion molding, blow molding, transfer molding or vacuum molding.

The shaped article in the present invention is available to the exterior parts of automobile because of the high calcium chloride resistance and the high crack resistance.

The exterior parts of automobile in the present invention means parts which are arranged in the engine room or on the car body directly, and do not mean parts which are arranged in the driver's room or car boards which constitute the car body itself.

These exterior parts of automobile are heated by the heat of engine and are cooled by contacting with atmosphere when the engine stops, and these phenomenon are repeated always. Furthermore, in the winter or in the cold countries, a splash of a mixture of the road antifreezing agent such as calcium chloride or magnesium chloride with snow is sprayed to surfaces of these exterior parts.

The typical examples of the exterior parts of automobile are a cooling fan, a radiator tank, a heater core tank, a cylinder head cover, a canister, an oil pan, a gear, a valve, a tube, a pipe and the like.

Additionally, the shaped article in the present invention can be subjected to secondary processing such as coating, vacuum evaporation and deposition, or bonding.

Other component such as a pigment, a dye, a thermal resistance agent, an antioxidizing agent, a weathering agent, a lubricant, or a nucleating agent may be incorporated into the polyamide resin composition in the present invention in so far as it does not spoil the moldability and physical properties thereof.

The following Examples will illustrate the present invention in more detail.

The physical properties of exterior parts of automobile and the corresponding specimens as described in Examples and Comparative Examples were measured or evaluated according to the following methods:

(1) relative viscosity: JIS K6810
(2) water absorption: ASTM D570
(3) tensile properties: ASTM D638
(4) flexural properties: ASTM D790
(5) Izod impact strength: ASTM D256
(6) heat distortion temperature: ASTM D648
(7) road antifreezing agent resistance:

After an injection molding is treated with warm water at 80° C. for 24 hours, a 5% aqueous solution of calcium chloride is coated on all surfaces of the molding for one hour, and then is put in a Geer's oven for one hour at 100° C., and then is put under ambient at −30° C. for one hour, and then is put under ambient at the room temperature for 30 minutes.

Thus, a repeating of the treatment of heating and cooling and treatment of coating of calcium chloride aqueous solution is counted as one cycle, it is counted the number of the cycles until the molding crazes.

EXAMPLE 1

40% by weight of nylon 66 having a relative viscosity of 2.8, 50% by weight of nylon 6.10 having a relative viscosity of 2.6 and 10% by weight of polyphenylene oxide having a relative viscosity of 0.48 were mixed, and then 55 parts by weight of chopped strand of glass fiber were added into 100 parts by weight of the mixture. The mixture was blended homogeneously by a stirror, and then the blend was melt kneaded and pelletized by an extruder having 65 mm of cylinder diameter.

The obtained pellets were dried under vacuum and then formed into a top of heater core tank of automobile and ASTM No. 1 dumbbell specimens with an injection molding machine at a cylinder temperature of 280° C. and at a mold temperature of 80° C. The results of measurement of the physical properties of the obtained specimens which were absolutely dried were as follows, proving that they were moldings well balanced in thermal resistance, rigidity, toughness, and the like.

| | |
|---|---|
| tensile strength | 1,900 kg/cm$^2$ |
| flexural strength | 2,800 kg/cm$^2$ |
| flexural modulus of elasticity | 91,000 kg/cm$^2$ |
| Izod impact strength | 13 kg · cm/cm notched |
| heat distortion temperature | 225° C. |
| water absorption | 0.7% |

The molded top of heater core tank was subjected to a cycle test on the calcium chloride resistance thereof as described above. No crazing was observed until 60 cycles, thus confirming that it was an automobile part having a very excellent road antifreezing agent resistance.

COMPARATIVE EXAMPLE 1

The calcium chloride resistance of a top of heater core tank obtained by molding a mixture of 100 parts by weight of nylon 66 and 55 parts by weight of a glass fiber as used in Example 1 under the same conditions as those of Example 1 was evaluated. Crazing occurred on the whole surface of the molding in only one cycle.

COMPARATIVE EXAMPLE 2

The calcium chloride resistance of a top of heater core tank obtained by molding a blend consisting of 100 parts by weight of mixture of 50% by weight of nylon 66 and 50% by weight of nylon 6 10, and 100 parts by weight of glass fiber as used in Example 1 under the same conditions as those of Example 1 was evaluated. Crazing occurred on the whole surface of the molding in 9 cycles.

COMPARATIVE EXAMPLE 3

The toughness, thermal resistance and calcium chloride resistance of ASTM No. 1 dumbbell specimens and top of heater core tank obtained by molding a mixture of 70% by weight of nylon 66, 27% by weight of nylon 6.10 and 3% by weight of PPO, and additionally 55 parts by a glass fiber which is added into 100 parts by weight of the mixture, under the same conditions as those of Example 1 were evaluated. Toughness and thermal resistance were high as shown below but as to calcium chloride resistance, crazing occurred on the surface of the molding in 3 cycles.

| | |
|---|---|
| tensile strength | 1,740 kg/cm$^2$ |
| heat distortion temperature | 231° C. |

EXAMPLE 2

40% by weight of copolyamide having a relative viscosity of 2.8 which was obtained by copolymerizing of a polyamide made from an equivalent salt of hexamethylene diamine and terephthalic acid and nylon 66 (nylon 66/6T), 50% by weight of nylon 6.10 having a relative viscosity of 2.7 and 10% by weight of polyphenylene oxide were mixed. 55 parts by weight of a chopped strand of glass fiber were added into 100 parts by weight of the mixture and after melt kneading the mixture under the same conditions as those of Example 1, top and base of heater core tank and dumbbell specimens were obtained by injection moldings of the blends.

The physical properties of specimens which were absolutely dried were as follows, proving that they were highly useful moldings excellent in thermal resistance, rigidity, toughness and so on.

| | |
|---|---|
| tensile strength | 1,860 kg/cm$^2$ |
| flexural strength | 2,750 kg/cm$^2$ |
| flexural modulus of elasticity | 90,500 kg/cm$^2$ |
| Izod impact strength | 15 kg · cm/cm notched |
| heat distortion temperature | 232° C. |
| water absorption | 0.6% |

The obtained top and base of heater core tank was subjected to a cycle test on the calcium chloride resistance thereof as described above. No crazing was observed until 60 cycles, thus confirming that it was an automobile part having a very excellent road antifreezing agent resistance and heating-cooling repeat resistance.

COMPARATIVE EXAMPLE 3

In to 100 parts by weight of the mixture of 50% by weight of the copolyamide as used in Example 2 and 50% by weight of nylon 6.10, 55 parts by weight of glass fiber were mixed and top and base of heater core tank was molded as the same manners as those of Example 2.

This shaped article was subjected to a cycle test on the calcium chloride resistance thereof as described above, but crazing was occurred on the surface of the shaped article in 10 cycles.

EXAMPLE 3

Into 100 parts by weight of the mixture of 50% by weight of the copolyamide as used in Example 2, 35% by weight of nylon 6.12 having a relative viscosity of 2.7 and 15% by weight of polyphenylene oxide as used in Example 1, 45 parts by weight of a chopped strand of glass fiber were mixed, and after the mixture was kneaded by the extruder as the same manner as Example 1, cylinder head cover with box shaped and dumbbell specimens were molded by injection molding.

The physical properties of specimens which were absolutely dried were as follows, proving that they had excellent properties in toughness, thermal resistance and rigidity.

| tensile strength | 1,760 kg/cm$^2$ |
|---|---|
| flexural strength | 2,650 kg/cm$^2$ |
| flexural modulus of elasticity | 80,000 kg/cm$^2$ |
| Izod impact strength | 16 kg · cm/cm notched |
| heat distortion temperature | 210° C. |
| water absorption | 0.7% |

The obtained cylinder head cover was subjected to a cycle test on the calcium chloride resistance thereof as described above. No crazing was observed until 60 cycles, thus confirming that it was an automobile part having a very excellent road antifreezing agent resistance and heating-cooling repeat resistance.

EXAMPLE 4

45% by weight of copolyamide having a relative viscosity of 2.9 which was obtained by copolymerizing of a polyamide made from an equivalent salt of hexamethylene diamine and isophthalic acid and nylon 66, 45% by weight of nylon 6.10 and 10% by weight of polyphenylene oxide as used in Example 1 were mixed.

15 parts by weight of a chopped strand of glass fiber were added into 100 parts by weight of the mixture and after kneading the mixture the same conditions as those of Example 1, cooling fan was molded by injection molding.

The obtained cooling fan was subjected to a cycle test on the calcium chloride resistance, and no crazing was observed until 60 cycles, thus confirming that it was an automobile part having a very excellent road antifreezing agent resistance and a heating-cooling repeat resistance.

EXAMPLES 5 to 8

The same operations as those of Example 1 are carried out except to change kinds and amounts of inorganic reinforcements and amounts of polyphenylene oxide.

The road antifreezing agent resistance and the heating-cooling repeat resistance of the obtained exterior parts of automobile were evaluated and the result were shown on Table 1.

It was confirmed that in all of the cases on Table 1, the polyamide resin shaped articles are useful excellently.

TABLE 1

| Example: | 5 | 6 | 7 | 8 |
|---|---|---|---|---|
| Nylon component (a) | 66 | N66/6T | 6 | N66/6T |
| (rel. viscosity) | (2.9) | (2.8) | (2.9) | (2.8) |
| (amt.: wt. %) | (50) | (45) | (40) | (55) |
| Nylon component (b) | 6.12 | 6.10 | 6.10 | 11 |
| (rel. viscosity) | (2.9) | (2.7) | (2.7) | (2.5) |
| (amt.: wt. %) | (40) | (40) | (45) | (30) |
| Component (c) polyphenylene oxide | PPO | PPO | PPO | PPO |
| (amt.: wt. %) | (10) | (15) | (15) | (15) |
| Inorganic reinforcement | glass fiber | glass fiber | glass fiber | glass fiber |
| (amt.: part by weight/100 parts of resin) | (35) wollastonite (25) | (35) talc (25) | (55) | (65) |
| Tensile strength (kg/cm$^2$) | 1,450 | 1,460 | 1,830 | 1,800 |
| Flexural strength (kg/cm$^2$) | 2,300 | 2,250 | 2,650 | 2,350 |
| Flexural modulus of elasticity (kg/cm$^2$) | 75,000 | 74,000 | 86,000 | 90,000 |
| Izod impact strength (kg · cm/cm notched) | 11 | 12 | 15 | 15 |
| Heat distortion temperature (°C.) | 210 | 210 | 215 | 228 |
| Heat cycle resistance (number of cycles until crazing occurs) | >45 | >50 | >60 | >40 |

EXAMPLE 9

45% by weight of nylon 6 having a relative viscosity of 3.6 and 55% by weight of nylon 6.10 having a relative viscosity of 2.7 were mixed homogeneously, melt kneaded, pelletized and dried. 100 parts by weight of the obtained pellet and 33 parts by weight of polyphenylene oxide were melt kneaded by an extruder with cylinder having diameter of 50 mm and pelletized.

The obtained pellet was dried in vacuum, and then molded by tubing molder of which the cylinder temperature is at 250° C. to get a tube having an outer diameter of 10 mm and an inner diameter of 9 mm.

The obtained tube was subjected to cycle test on the calcium chloride resistance as in Example 1, and no crazing was observed until 40 cycles, thus confirming that it has an excellent road antifreezing agent resistance.

What is claimed is:

1. A polyamide resin composition comprising:
   (a) 25–55% by weight of at least one polyamide resin selected from the group consisting of nylon 6, nylon 66, nylon 6T, nylon 66/6T, nylon 6I, nylon 66/6I, nylon 6/6T and nylon 6/6I;
   (b) 55 to 40% by weight of at least one polyamide resin selected from the group consisting of nylon 11, nylon 12, nylon 6×10, nylon 6×12 and nylon 11×6; and
   (c) 20 to 5% by weight of a polyphenylene oxide.

2. The polyamide resin composition according to claim 1, wherein the polyphenylene oxide of the component (c) is represented as formula I,

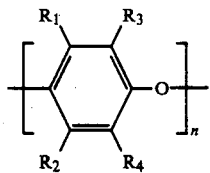

wherein each of $R_1$ and $R_4$ is hydrogen or alkyl group having 1 to 4 carbon atoms.

3. The polyamide resin composition according to claim 1, wherein the polyphenylene oxide of the component (c) is modified.

4. The polyamide resin composition according to claim 1, furthermore 1 to 200 parts by weight of an inorganic reinforcement are blended into 100 parts by weight of the polyamide resin composition consisting of components (a), (b) and (c).

5. A shaped article composed of a polyamide resin composition comprising:
(a) 25 to 55% by weight of at least one polyamide resin selected from the group consisting of nylon 6, nylon 66, nylon 6T, nylon 66/6T, nylon 6I, nylon 66/6I, nylon 6/6T and nylon 6/6I;
(b) 55 to 40% by weight of at least one polyamide resin selected from the group consisting of nylon 11, nylon 12, nylon 6×10, nylon 6×12 and nylon 11×6; and
(c) 20 to 5% by weight of a polyphenylene oxide.

6. The shaped article according to claim 5, wherein the shaped article is molded by means of an extrusion molding or an injection molding.

7. The shaped article according to claim 5, wherein the polyamide resin composition is further blended with an inorganic reinforcement.

8. An exterior part for automobile composed of a polyamide resin composition comprising:
(a) 26 to 55% by weight of at least one polyamide resin selected from the group consisting of nylon 6, nylon 66, nylon 6T, nylon 66/6T, nylon 6I, nylon 66/6I, nylon 6/6T and nylon 6/6I;
(b) 55 to 40% by weight of at least one polyamide resin selected from the group consisting of nylon 11, nylon 12, nylon 6×10, nylon 6×12 and nylon 11×6; and
(c) 20 to 5% by weight of a polyphenylene oxide.

* * * * *